(12) United States Patent
Lynch

(10) Patent No.: US 8,618,412 B2
(45) Date of Patent: Dec. 31, 2013

(54) HIGH VOLTAGE CABLE AND INSULATOR SHIELD

(75) Inventor: Michael Lynch, Reno, NV (US)

(73) Assignee: Eco Electrical Systems, Reno, NV (US)

( * ) Notice: Subject to any disclaimer, the term of this patent is extended or adjusted under 35 U.S.C. 154(b) by 104 days.

(21) Appl. No.: 13/466,778

(22) Filed: May 8, 2012

(65) Prior Publication Data

US 2013/0299230 A1    Nov. 14, 2013

(51) Int. Cl.
    *H02B 1/06* (2006.01)

(52) U.S. Cl.
    USPC ........... 174/5 R; 174/138 F; 119/713; 52/101

(58) Field of Classification Search
    USPC .......... 174/137 R, 5 R, 5 SB, 5 SG, 17 R, 32, 174/40 R, 41–44, 45 R, 45 TD, 84 R, 86, 87; 285/129.2, 139.1, 148.8, 278, 280, 285/405–416, 184; 403/53, 6; 119/713; 52/101

See application file for complete search history.

(56) References Cited

U.S. PATENT DOCUMENTS

| | | | | |
|---|---|---|---|---|
| 5,873,324 | A * | 2/1999 | Kaddas et al. | 119/174 |
| 6,730,852 | B1 * | 5/2004 | Puigcerver et al. | 174/138 F |
| 7,154,036 | B2 * | 12/2006 | Lynch | 174/5 R |
| 7,297,869 | B2 * | 11/2007 | Hiller et al. | 174/40 R |
| 7,834,269 | B2 * | 11/2010 | Niles | 174/84 R |
| 2013/0153258 | A1 * | 6/2013 | Bernard et al. | 174/87 |

OTHER PUBLICATIONS

TE Connectivity, "Webpage Description of BCIC-G-PIN-795", <http://energy.te.com/index.asp?act=page&pag_id=2&prl_id=5&pls_id=29&prf_id=133&prr_id=957>, 2012.

* cited by examiner

*Primary Examiner* — Jayprakash N Gandhi
*Assistant Examiner* — Michael Matey
(74) *Attorney, Agent, or Firm* — Patent Law Group LLP; Brian D. Ogonowsky

(57) ABSTRACT

A plastic shield for a cable and insulator is described having a center section for covering the insulator. The center section has an opening at both its ends for the cable. Proximate each opening is a pivotable flange, where the flange pivots at one end of the flange. An arm extends from each of the cable openings of the center section, and each arm covers the cable exiting the center section. Each arm is pivotally attached to the other end of the associated flange. The length of the flange will typically be about 2-3 inches. The flange allows its associated arm to be moved over a wide range of lateral angles (e.g., up to 45 degrees) and allows the arms to have a lateral offset relative to the center line of the center section and insulator to accommodate a cable that is offset from the center line.

16 Claims, 7 Drawing Sheets

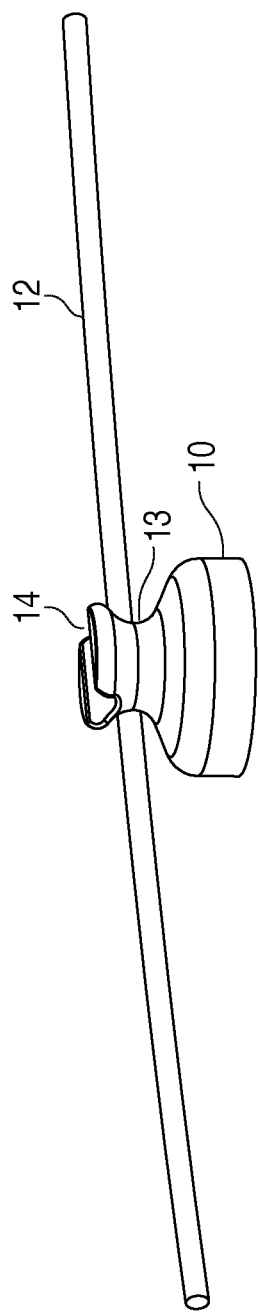
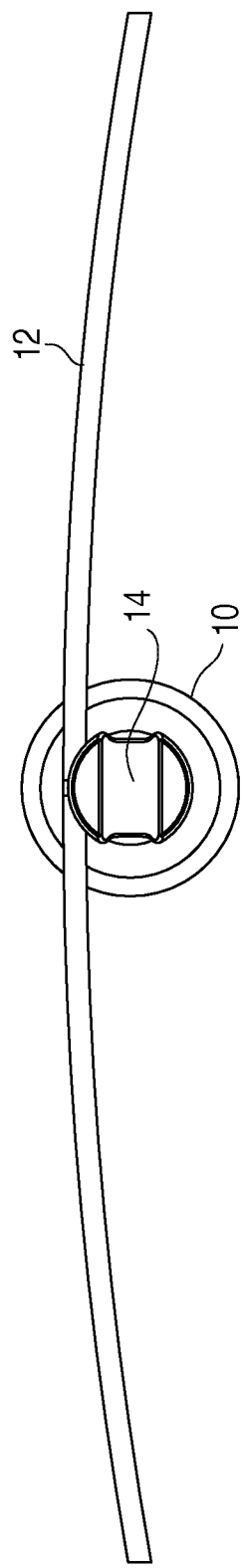

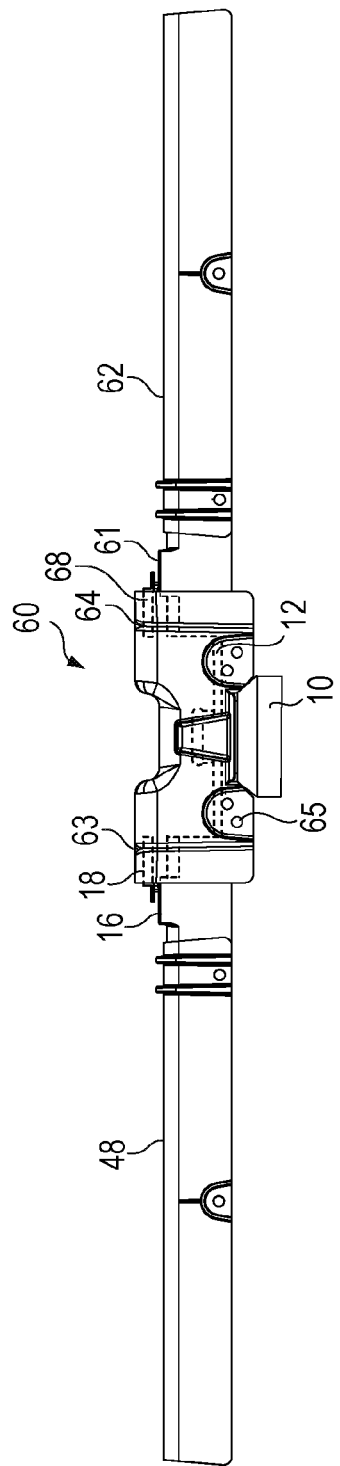
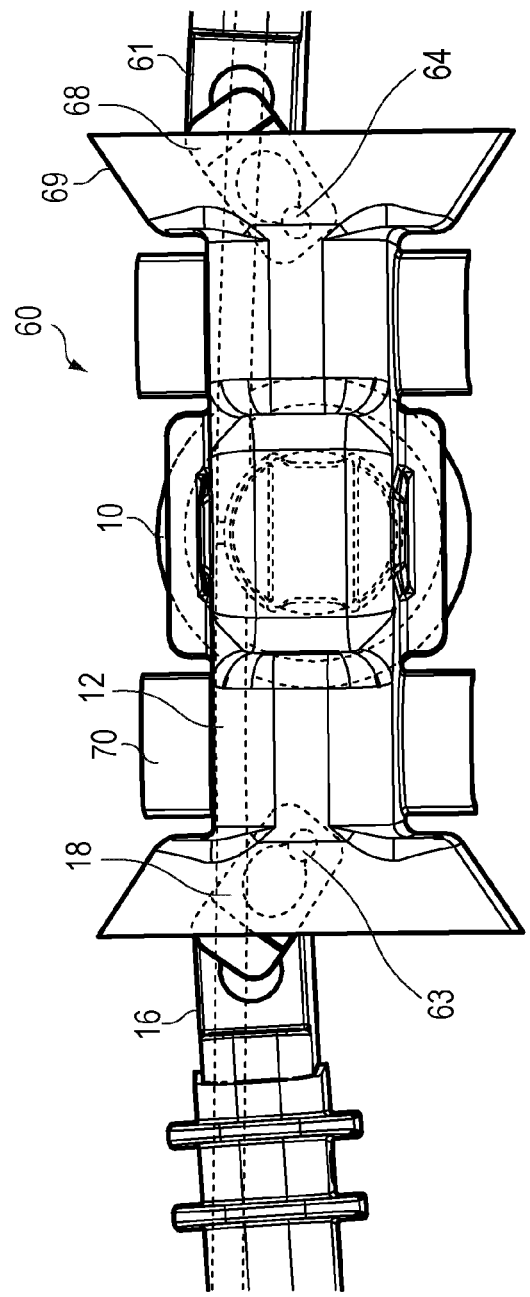
FIG. 6
FIG. 7

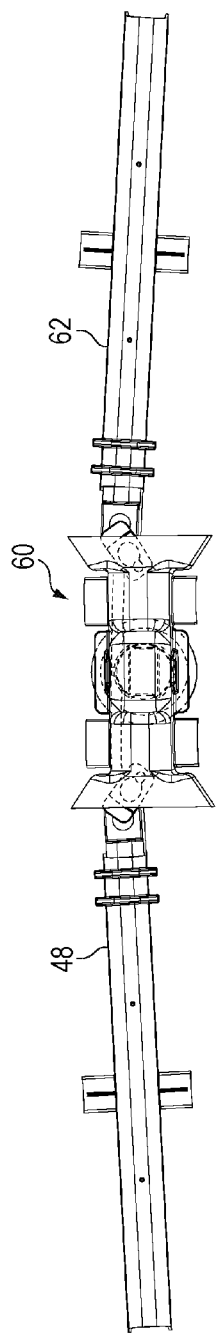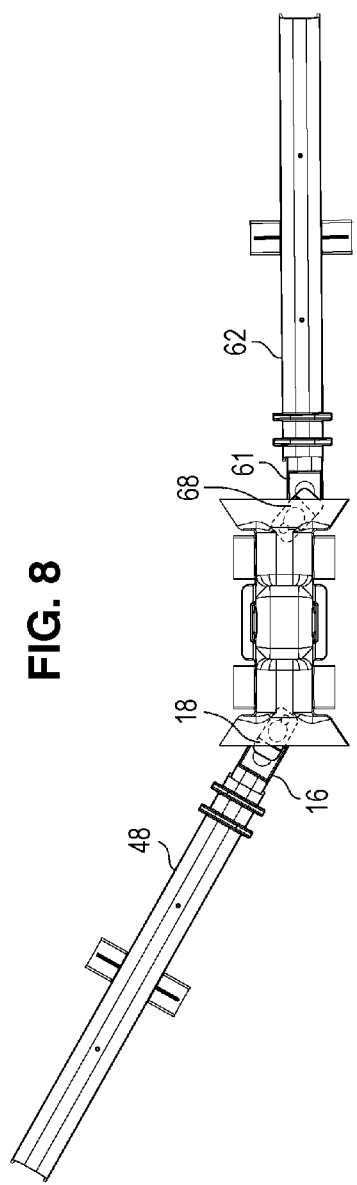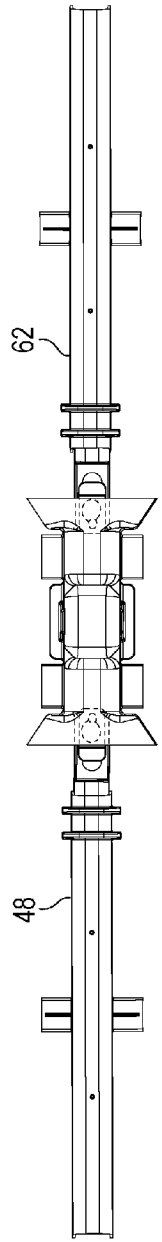

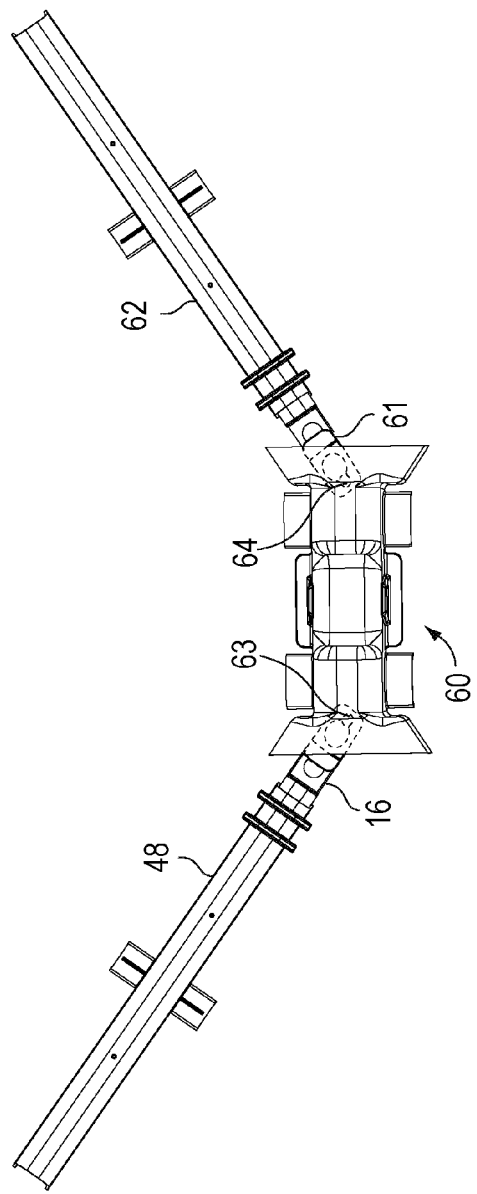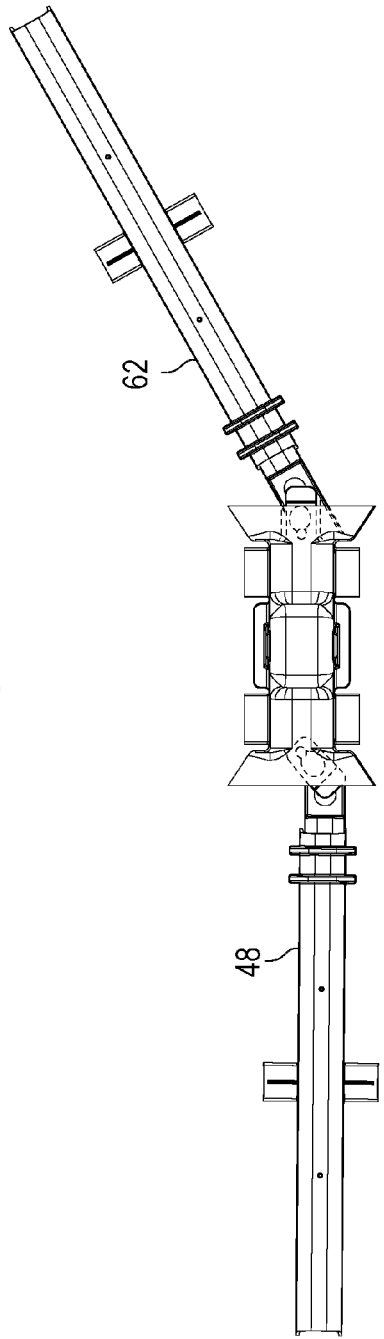

HIGH VOLTAGE CABLE AND INSULATOR SHIELD

FIELD OF THE INVENTION

This invention relates to a shield for a high voltage cable and its supporting insulator to prevent shorting by wildlife and trees, and, in particular, to a shield that adapts to any angle and asymmetry of the cable bending around the insulator.

BACKGROUND

It is common to support medium to high voltage (e.g., greater than 2 Kvolts) cables on wooden poles supported by ceramic insulators. Frequently, there are three parallel cables, each carrying a different phase. If there is a short to ground or a short between cables, a fuse or breaker will trip, causing a power outage or a rerouting of the electricity. A lineman must then fix the problem and reset the fuse/breaker.

FIG. 1 is a perspective view of a conventional ceramic insulator 10 that is mounted on a wooden pole (not shown) using conventional hardware, such as a bracket or a bolt. Round insulators are typically 4-8 inches in diameter. A bare cable 12 is secured to the insulator 10 by a wire (not shown) twisted around the insulator neck 13 and the cable 12. FIG. 2 is a top down view of the insulator 10 and cable 12. For three phase distribution, there are typically two insulators/cables at the ends of a wooden cross-arm and one insulator/cable supported in the middle or on the top of the pole.

When there is a straight run of the cable 12, the cable 12 may be supported by the indent 14 at the top of the insulator 10 or may be tied to the side of the neck 13. A twist wire keeps the cable 12 in place. When the cable path needs to change direction, the cable 12 is bent around the neck 13 of the insulator 10, as shown in FIGS. 1 and 2. If the cable 12 is supported by the indent 14, for a straight run, the structure is symmetrical. If the cable 12 is tied to the side of the neck 13, as shown in FIGS. 1 and 2, the structure is asymmetrical.

In locations where there are trees, large birds, other animals, or the voltage is particularly high, cable shields are sometimes used to prevent arcing by a tree or an animal when the tree or animal contacts two or more of the phased cables. It is common to only put the shield over the center insulator/cable. Such shields are formed of a plastic, which may be resilient or rigid.

Shields that simply cover a straight cable 12 supported by the top indent 14 of the insulator 10 are simple and adequate, since the insulator/cable structure is symmetrical.

Shields are known that have two arms extending from a wide central portion of the shield that covers the ceramic insulator, where the arms cover the cable extending in both directions. The shield is formed of a soft, resilient plastic, and the arms can bend at different angles relative to the central portion. One such shield is the Tyco Electronics Corporation BCIC-G-PIN-795 raptor guard, whose arms flex up to 30 degrees.

One problem with the BCIC-G-PIN-795 shield is that it assumes the cable 12 is supported symmetrically at the center of the insulator 10 within the indent 14. However, if the cable 12 is bent around the neck 13 of the insulator 10, the insulator/cable is not symmetrical, and the shield will not properly fit over the insulator 10 and cable 12. As a result, the resilient shield material will be angled and distorted. This reduces the effectiveness of the shield and is not aesthetically pleasing. An angled shield opens up the underside of the shield to the wind, placing a large strain on the shield.

What is needed is a universal shield for cables supported by insulators, where the shield precisely adapts, without any distortion, to the asymmetrical arrangement of a cable 12 bent around the neck 13 of the insulator 10, as well as when the cable 12 is supported by the indent 14 at the top of the insulator 10.

SUMMARY

A plastic shield for a cable and insulator is described comprising a center section for covering the insulator. Two arms extend from the center section and each is attached to the center section by a respective pivoting flange. The flange has a first pivoting connection point at one end and a second pivoting connection point at its other end. The first pivoting connection point is attached to the center section, and the second pivoting connection point is attached to one of the arms. The length of the flange will typically be about 2-3 inches. The flange allows its associated arm to be moved over a wide range of lateral angles (e.g., up to 45 degrees) to accommodate a bend in the cable. To accommodate a cable that is laterally offset from the center of the insulator when the cable is tied to the side of the insulator's neck, the flange, by pivoting around the arm, adds a lateral offset up to 3 inches for each arm. The length of the flange is set to accommodate the offset between the center of the insulator to the center of the cable when the cable is tied to the side of the neck of the insulator. The flange may have any suitable length (e.g., 2-4 inches), depending on the maximum size of the insulator.

Another unique aspect of the shield is that each arm comprises a short arm adapter, that connects to the flange located within the center section of the shield, and an arm extension that fits over the portion of the arm adapter that extends beyond the center section. Any length arm extension may be fitted over the arm adapter. The small size of the arm adapter makes it is easy to manipulate when connecting it, via the flange, to the center section. Also, the arm adapter may be formed of a more rigid material than the arm extension, and the arm extension can be selected to have different lengths.

The arm adapter has a flared end (toward the ceramic insulator) to prevent water dripping on the cable. The arm adapter has vertical ribs, and the arm extension has vertical grooves that receive the ribs as the arm extension is brought down into position over the arm adapter. The molded grooves form protruding ribs on the outside of the arm extension that divert water to prevent the water entering the center section.

Holes are provided along the shield for receiving plastic pins that are inserted using a hot stick. The pins prevent the shield being lifted off the cable and insulator. Each hole may optionally have a cowl over it to prevent the pins being used as a bird perch.

Other features of the shield are also described.

BRIEF DESCRIPTION OF THE DRAWINGS

FIG. 1 is a perspective view of a prior art insulator and cable.

FIG. 2 is a top down view of FIG. 1.

FIG. 6 illustrates the shield of FIG. 5 positioned over an insulator and a cable.

FIGS. 7-12 are semi-transparent top down views of the shield, where the cable is at different angles and different offsets from the center line.

FIG. 7 illustrates the shield, where the cable is slightly bent around the neck (upper part of neck in FIG. 7) of the insulator, causing both arms to be offset (upward in FIG. 7) to accommodate the asymmetry of the insulator/cable.

FIG. 8 is a wider view of the shield of FIG. 7 showing the arm extensions.

FIG. 9 illustrates the shield, where the cable runs straight from the right and is bent around the neck (bottom part of neck in FIG. 9) of the insulator, causing one arm to be straight and offset and the other arm to be angled and not offset.

FIG. 10 illustrates the shield, where the cable is supported by the indent in the top of the insulator and running straight, causing the shield's arms to be straight and not offset.

FIG. 11 illustrates the shield, where the cable is bent around the neck (the bottom part of the neck in FIG. 11) of the insulator, causing both arms to be angled and not offset due to the particular angle.

FIG. 12 illustrates the shield, where the cable runs straight from the left side and is bent around the neck (the bottom part of the neck in FIG. 12) of the insulator, causing one arm to be straight and offset and the other arm to be angled and offset.

Elements labeled with the same numerals may be identical or similar.

DETAILED DESCRIPTION

The invention is a shield or cover for an insulator supporting a cable carrying medium or high voltages, where the insulator is supported by a utility pole or tower. The shield will typically be a molded plastic material such as a slightly resilient PVC or HDPE. The shield prevents arcing caused by large birds, animals, or trees bridging the gap between cables carrying different phases or between a cable and ground. The cables may be run laterally spaced from each other run vertically spaced from each other.

Figure 3:
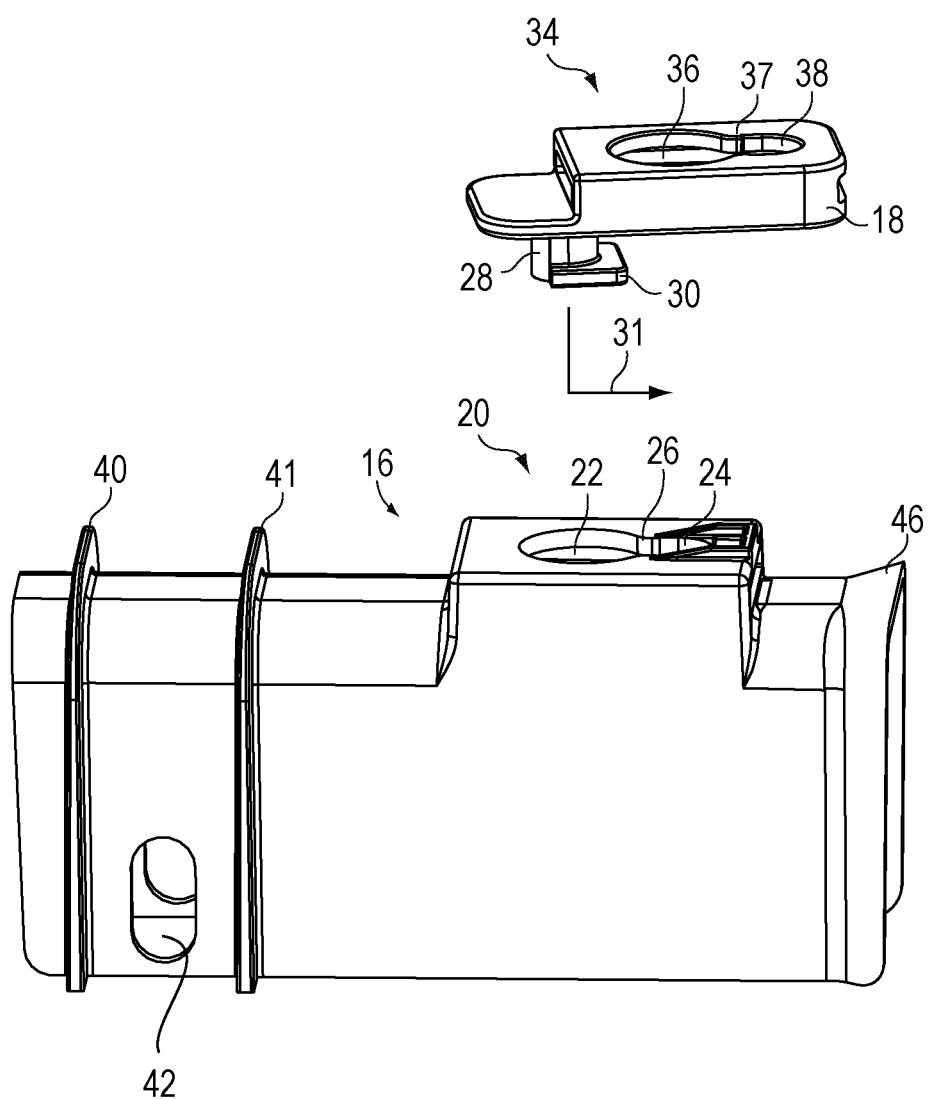
FIG. 3 is an exploded perspective view of the arm adapter and flange.
Figure 4:
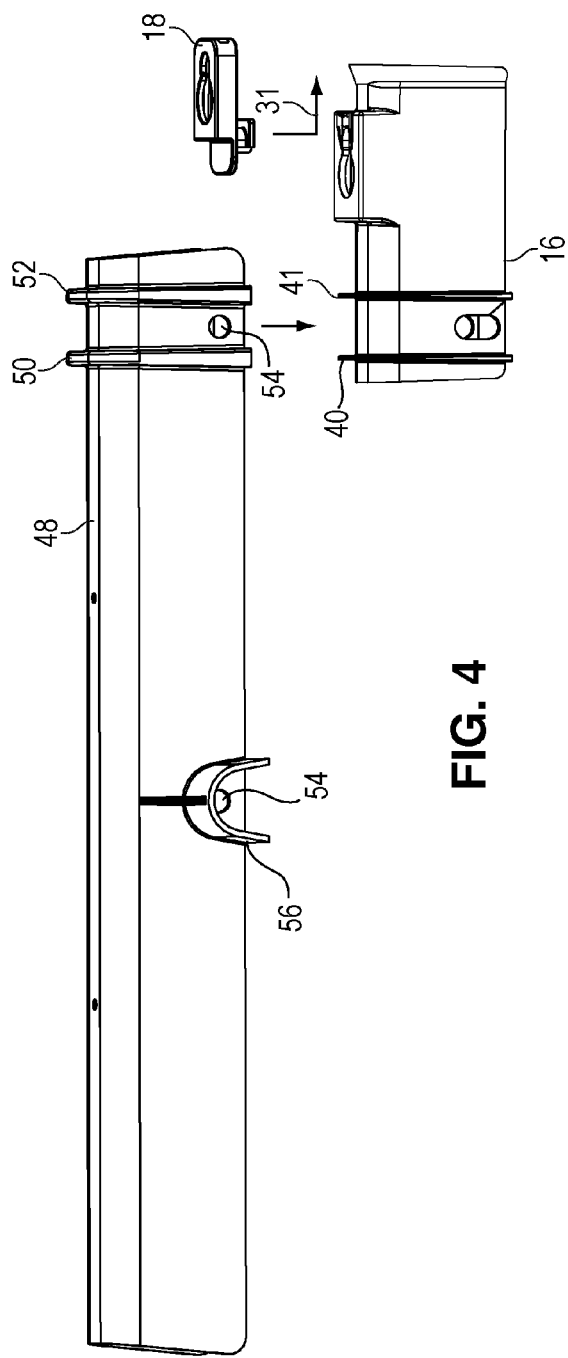
FIG. 4 is a perspective view of the arm extension being connected to the arm adapter.
Figure 5:
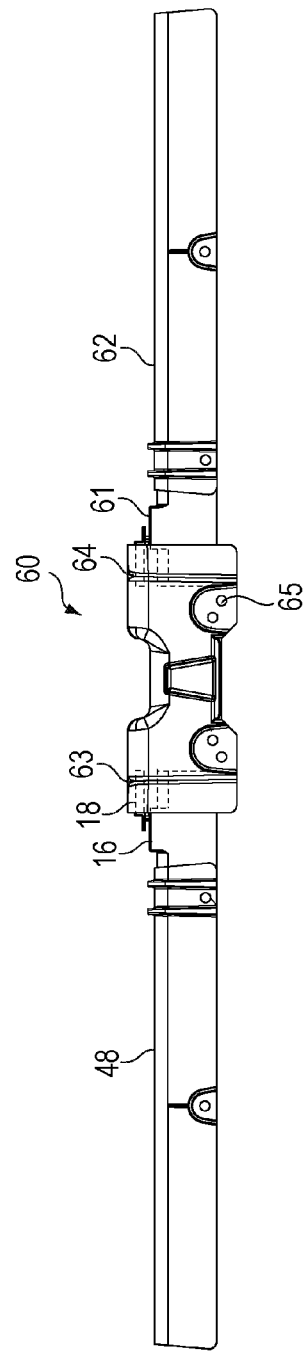
FIG. 5 is a semi-transparent side view of the completed shield in a straight configuration, with the arm adapter being connected to the center section solely by the pivoting flange.

FIGS. 3-5 illustrate the four connectable pieces of the shield.

FIG. 3 illustrates and arm adapter 16 and a flange 18. The arm adapter 16 is formed to have a U-shape to cover the cable. The top portion of the arm adapter 16 has a keyhole 20 comprising a wide hole 22, a small hole 24, and a constrictor 26 that is slightly narrower than the hole 24. In one embodiment, the wide hole 22 is about 0.5 to 0.75 inches in diameter, and the small hole 24 is slightly less than half the diameter of the wide hole 22.

The flange 18 includes a bottom, cylindrical connector 28 having a flat bottom extension 30. The connector 28 and extension 30 fit through the wide hole 22 in the arm adapter 16, and the flange 18 is then forced backward (as shown by arrow 31) to cause the connector 28 (or constrictor 26) to slightly deform when passing through the constrictor 26. When the connector 28 is positioned within the small hole 24, the connector 28 is effectively locked into the hole 24 and can pivot freely. The extension 30 prevents the flange 18 from being released vertically through the small hole 24. The arm adapter 16 material and flange 18 material are selected to have a suitable resiliency to allow the locking to occur. The flange's 18 movement will be substantially restricted to only pivoting (rather than tilting) due to the extension 30 and flange 18 bottom surface abutting the bottom and top surfaces, respectively, of the shelf surrounding the small hole 24.

The flange 18 has an identical keyhole 34, having a wide hole 36, constrictor 37, and small hole 38 for attachment to a connector and extension within a center section of the shield (described later) that are identical to the connector 28 and extension 30 described above.

The arm adapter 16 has protruding vertical ribs 40 and 41 for being inserted in corresponding grooves in an arm extension. A hole 42 is formed in the arm adapter 16 for receiving a pin. The hole 42 is elongated to allow some misalignment between the arm adapter 16 and the arm extension.

The arm adapter 16 has a flared end 46 (toward the ceramic insulator) to prevent water dripping on the cable.

FIG. 4 illustrates the arm extension 48 being aligned with the arm adapter 16 for fitting them together. The molded ribs 50 and 52 on the arm extension 48 form grooves inside the arm extension 48 for receiving the ribs 40 and 41 on the arm adapter 16. The heights of the arm extension 48 and arm adapter 16 may be on the order of 3-6 inches, and their widths may be on the order of 1-2 inches to accommodate a cable.

The ribs 50 and 52 additionally block water travelling along the arm extension 48 toward the cable or insulator.

The arm extension 48 includes holes 54 for receiving a pin that extends below the cable for preventing the shield coming off the cable. One hole 54 is shown having a cowl 56 over it to prevent birds from using the pin as a perch. The hole 54 between the ribs 50 and 52 may optionally have a cowl.

FIG. 5 shows the center section 60 that has a center cavity which receives the neck 13 (FIG. 1) of the insulator 10. FIG. 6 illustrates the shield covering the insulator 10 and cable 12. The insulator 10 is connected to a utility pole or tower. The arm adapters 16 and 61 are identical, and the arm extensions 48 and 62 are identical.

Near the openings of the center section 60 are down-extending cylindrical connectors 63 and 64, each with a flat bottom extension (obscured in FIG. 5), that are identical to the connector 28 (FIG. 3) and extension 30 of the flange 18. All features of each part (e.g., 16, 18, 60, 48) are molded so that each part is a single piece. The flange top keyhole 34 (FIG. 3) is snapped into the connector 63 so that the connector 63 pivots in the small hole 38 in the flange 18. This allows the arm adapter 16 to pivot around the flange connector 28 and move laterally (for offset) with respect to the center section 60. Holes 65 in the center section 60 receive pins that extend under the cable 12 for securing the center section 60 over the insulator 10.

FIG. 7 is a top down view of the shield covering the insulator 10 and cable 12. The center section 60 has a center line (not shown) bisecting it along its length. The cable 12 is wire-tied to the side of the insulator 10 neck which, in FIG. 7, is the upper side of the neck. The cable 12 is slightly bent. Since the cable 12 is not symmetrical with the insulator 10, the arm adapters 16 and 61 are offset (pivoted with respect to flanges 18 and 68) to accommodate the asymmetry and are angled to accommodate the slight bend in the cable 12. Note how the flanges 18 and 68 are not in-line with either the center section 60 or the arm adapters 16 and 61. If the opening to the arm adapter 16 or 61 does not align with the center line bisecting the center section 60 (due to the flange pivoting with respect to the arm adapter), the arm adapter is considered to be offset. In other words, the flanges 18 and 68 allow the arm adapters to have a lateral offset relative to the center line of the center section 60 and insulator 10 to accommodate a cable 12 that is offset from the center line.

The center section 60 has flared openings 69 to allow side to side movement of the arm adapters 16 and 61. Cowls 70 are shown over the pin holes 65.

FIG. 8 is a widened view of FIG. 7 to show the arm extensions 48 and 62.

In FIGS. 9-12, the insulator 10 and cable 12 are not shown for simplicity.

FIG. 9 illustrates the shield, where the cable runs straight from the right and is bent around the neck of the insulator, which is the bottom of the neck in the top view of FIG. 9, causing the arm extension 62 to be straight and offset (by the arm adapter 61 pivoting around the flange 68), and the arm extension 48 to be angled but not offset (no pivoting of the arm adapter 16 around the flange 18).

FIG. 10 illustrates the shield, where the cable is supported by the indent 14 (FIG. 1) in the top of the insulator 10 and runs straight (creating a symmetrical structure), causing the shield's arm extensions 48 and 62 to be straight and not offset (no pivoting around the flanges).

FIG. 11 illustrates the shield, where the cable is bent around the neck of the insulator, which is the bottom part of the neck in the top view of FIG. 11, causing both arm extensions 48 and 62 to be angled. Due to the large bend, the arm adaptors 16 and 61 are not offset (i.e., the cable approximately passes directly under the cylindrical connectors 63 and 64 on the center support 60).

FIG. 12 illustrates the shield, where the cable runs straight from the left side and is bent around the neck of the insulator, which is the bottom part of the neck in the top view of FIG. 12, causing the arm extension 48 to be straight and offset and the arm extension 62 to be angled and offset.

Figures 13A, 13B:
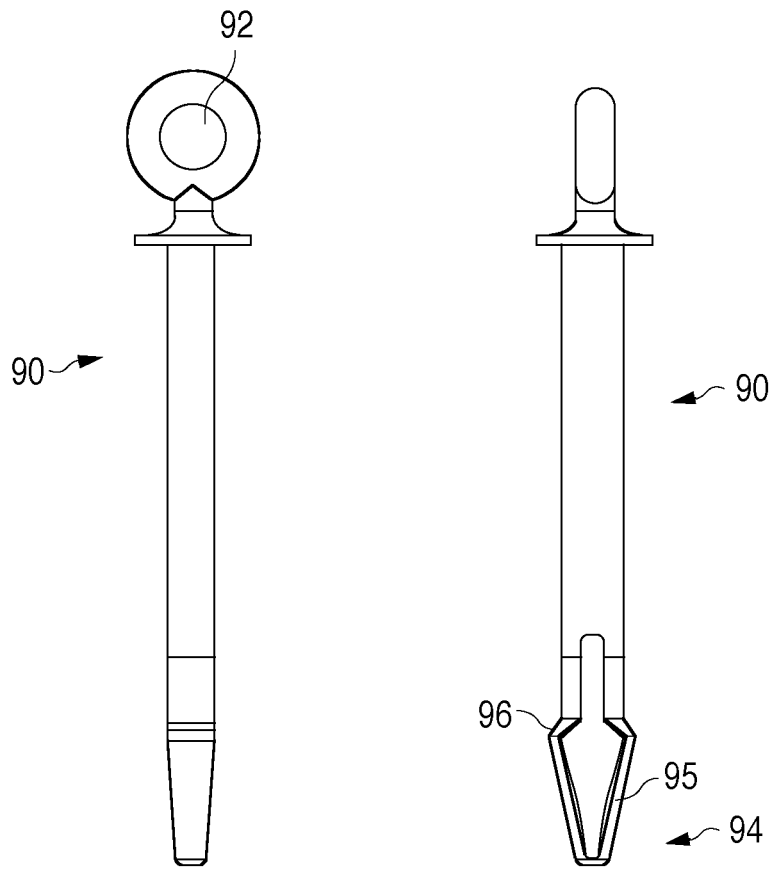
FIG. 13A is a front view of a pin that may be used to secure the shield over the insulator and cable.
FIG. 13B is a side view of the pin of FIG. 13A.

FIG. 13A is a front view of a plastic retaining pin 90 that may be used to secure the shield over the insulator 10 and cable 12. FIG. 13B is a side view of the pin 90 of FIG. 13A. The pin 90 may be 3-4 inches long, sufficient to pass through both opposing holes along the shield's length below the cable 12 to prevent the shield from coming off the cable and insulator.

The end of the pin 90 has a round grasping hole 92 for grasping by a hook of a hot stick.

The nose 94 has a relatively long front portion 95 that expands out from the tip at about a 15 degree angle. The nose 94 has an opening to allow the nose to be compressed when passing through a hole slightly larger than the shaft of the pin 90. The shallow angle and long nose allow the pin 90 to be pushed through the holes in the shields using a relatively low pushing force to compress the nose 94. The back part 96 of the nose is relatively short and has a relatively steep angle of about 45 degrees, so as to require a higher pulling force to compress the nose when removing the pin from the hole. This ensures that the pin 90 will not be inadvertently pulled out of the hole during high winds. In one embodiment, the insertion force is about three pounds, and the removal force is about six pounds. It is much easier to pull on a pin with a long hot stick, so the increased pulling force is not a problem for the lineman.

Many variations of the flange 18, arm adapter 16, arm extension 48, and center section 60 may be used while still achieving the offset of the arms with respect to the center section. In another embodiment, the arm adapter and arm extension are an integral piece.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is claimed is:

1. A shield for an insulator and cable carrying a voltage, the insulator supporting the cable, the shield comprising:

a center section configured to cover at least a portion of the insulator, the center section having a first pivot feature proximate to a first opening of the center section and having a second pivot feature proximate to a second opening of the center section, the center section having a center line bisecting it along its length;

a first arm having a third pivot feature, the first arm configured to enter the first opening of the center section, the first arm having a third opening for the cable;

a second arm having a fourth pivot feature, the second arm configured to enter the second opening of the center section, the second arm having a fourth opening for the cable;

a first flange having a fifth pivot feature engaging the first pivot feature of the center section such that the first flange is pivotable around the first pivot feature, the first flange having a sixth pivot feature engaging the third pivot feature on the first arm such that the first flange is pivotable around the third pivot feature, the first flange enabling the third opening of the first arm to be offset from the center line of the center section by the first flange pivoting with respect to the third pivot feature of the first arm; and a second flange having a seventh pivot feature engaging the second pivot feature of the center section such that the second flange is pivotable around the second pivot feature, the second flange having an eighth pivot feature engaging the fourth pivot feature on the second arm such that the second flange is pivotable around the fourth pivot feature, the second flange enabling the fourth opening of the second arm to be offset from the center line of the center section by the second flange pivoting with respect to the fourth pivot feature of the second arm.

2. The shield of claim 1 wherein the fifth pivot feature of the first flange comprises a first hole in the first flange, wherein the first pivot feature of the center section comprises a downward extending first pin that extends through the first hole in the first flange to allow the first flange to pivot with respect to the first pin.

3. The shield of claim 2 wherein the third pivot feature of the first arm comprises a second hole in the first arm, wherein the sixth pivot feature of the first flange comprises a downward extending second pin that extends through the second hole in the first arm to allow the first flange to pivot with respect to the second pin and to allow the first arm to pivot with respect to the center section.

4. The shield of claim 3 wherein the seventh pivot feature of the second flange comprises a third hole in the second flange, wherein the second pivot feature of the center section comprises a downward extending third pin that extends through the third hole in the second flange to allow the second flange to pivot with respect to the third pin, wherein the fourth pivot feature of the second arm comprises a fourth hole in the second arm, wherein the eighth pivot feature of the second flange comprises a downward extending fourth pin that extends through the fourth hole in the second arm to allow the second flange to pivot with respect to the fourth pin and to allow the second arm to pivot with respect to the center section.

5. The shield of claim 4 wherein the first hole, the second hole, the third hole, and the fourth hole are each part of a respective keyhole for locking the first pin, the second pin, the third pin, and the fourth pin in the respective one of the first hole, the second hole, the third hole, and the fourth hole.

6. The shield of claim 1 wherein the first arm comprises a first part and a first extension part that attaches to the first part, and wherein the second arm comprises a second part and a second extension part that attaches to the first part.

7. The shield of claim 1 wherein the first flange is identical to the second flange.

8. The shield of claim 1 wherein the center section has flared openings for the first arm and the second arm to accommodate a range of angles of the first arm and the second arm.

9. The shield of claim 1 wherein the first arm comprises first through holes, and wherein the second arm has second through holes, the shield further comprising:
   first pins extending through the first through holes and under the cable to secure the first arm to the cable; and
   second pins extending through the second through holes and under the cable to secure the second arm to the cable.

10. The shield of claim 1 further comprising the cable and the insulator, the center section being affixed over the insulator, and the first arm and the second arm being affixed over the cable.

11. The shield of claim 1 wherein the center section, first arm, and second arm are formed of a plastic that does not substantially bend during use.

12. The shield of claim 1 wherein the first arm and the second arm has a range of movement of over 30 degrees when pivotally coupled to the center section.

13. The shield of claim 1 wherein the first arm has protruding first ribs which divert water away from the center section.

14. The shield of claim 1 wherein the shield is affixed to the insulator and the cable, wherein the cable is bent around the insulator, and wherein at least one of the first arm and the second arm are at an angle with the center line of the center section.

15. The shield of claim 1 wherein the first flange has a first length dimension between the fifth pivot feature and the sixth pivot feature such that the first arm can be offset from the center line of the center section, and wherein the second flange has a second length dimension between the seventh pivot feature and the eighth pivot feature such that the second arm can be offset from the center line of the center section.

16. The shield of claim 1 wherein the first flange and the second flange are resilient.

* * * * *